F. G. THURSTON.
Furrow-Scrapers.
No. 146,848.    Patented Jan. 27, 1874.
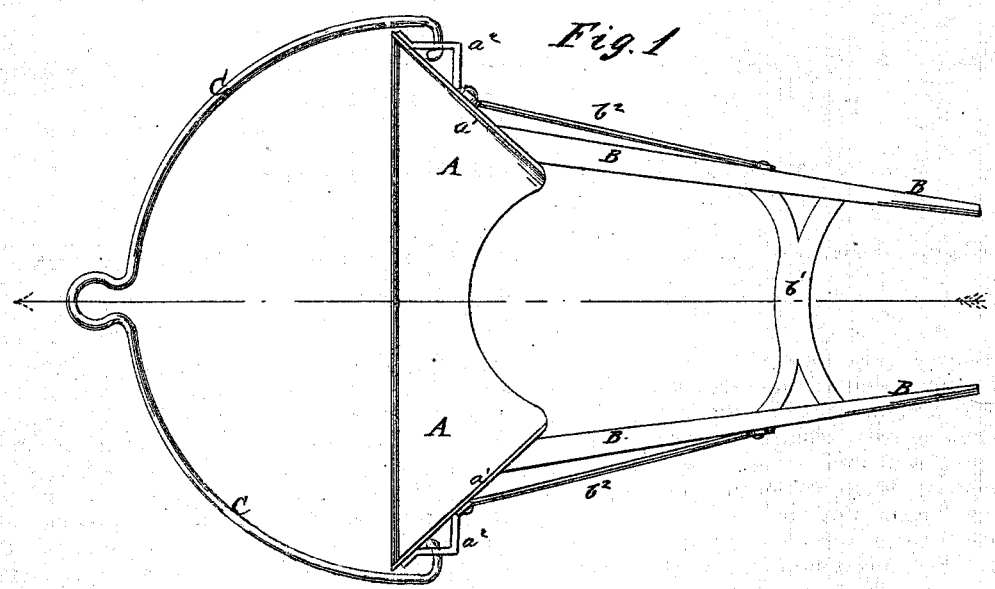
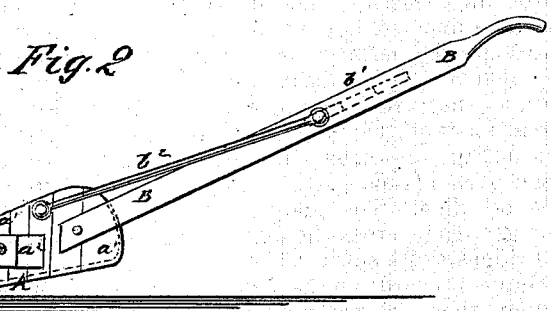
Witnesses:
A. W. Almqvist
Alex F. Roberts
Inventor:
F. G. Thurston
per Munn & Co.
Attorneys.

UNITED STATES PATENT OFFICE.

FREDERICK G. THURSTON, OF NEW YORK, N. Y., ASSIGNOR TO M. MA DEL GADO AND JOAQUIN LLERA, OF SAME PLACE.

IMPROVEMENT IN FURROW-SCRAPERS.

Specification forming part of Letters Patent No. 146,848, dated January 27, 1874; application filed August 23, 1873.

*To all whom it may concern:*

Be it known that I, FREDERICK G. THURSTON, of New York city, in the State of New York, temporarily residing in the Island of Cuba, have invented a new and useful Improvement in Furrow - Scraper, of which the following is a specification:

Figure 1 is a top view of my improved scraper. Fig. 2 is a side view of the same.

My invention has for its object to furnish an improved scraper for scraping down ridges, and filling up the intervening furrow, and which shall be simple in construction, convenient in use, and effective in operation; and it consists in the scraper-plate, constructed as hereinafter fully described, and provided with handles and a draft-bail, as set forth.

A represents the scraper-plate, the forward edge of which is made straight, and is beveled to cause it to enter the ground readily. The middle rear part of the plate A is cut away, as shown in Fig. 1, to cause the soil taken up by the end parts of said plate to pass into the furrow to be filled. The plate A is made of such a length as to cross the furrow and rest upon the ridges at its sides. The ends of the plate A have upwardly-projecting flanges $a^1$ formed upon them, which incline inward and rearward, as shown in Fig. 1, so as to cause the soil taken up by the end parts of the said plate A to pass inward, and drop through the notch in the rear part of the plate into the furrow. B are the handles, the forward ends of which are secured to the rear part of the flanges $a^1$, and their rear parts are connected and held in their proper relative positions by the branched cross bar or brace $b^1$. The handles B are further strengthened by the braces $b^2$, the forward ends of which are secured to the upper parts of the flanges $a^1$, and their rear ends are secured to the middle parts of the handles B. To the outer sides of the forward parts of the flanges $a^1$ are secured ears $a^2$, to which are pivoted the ends of the bail C, to which the draft is applied. With the machine thus constructed the work of filling up the furrows is accomplished quickly, easily, and thoroughly.

Having thus described my invention, I claim as new and desire to secure by Letters Patent—

In a furrow-scraper, the plate A provided with lateral vertical flanges $a^1$ $a^1$ converging to the cut-away central portion of said plate, as and for the purpose set forth.

FREDK. G. THURSTON.

Witnesses:
JOS. A. SPRINGER,
JOS. A. RAPHEL.